(12) United States Patent
Duong et al.

(10) Patent No.: US 12,236,321 B2
(45) Date of Patent: Feb. 25, 2025

(54) BATCHING TECHNIQUES FOR HANDLING UNBALANCED TRAINING DATA FOR A CHATBOT

(71) Applicant: Oracle International Corporation, Redwood Shores, CA (US)

(72) Inventors: Thanh Long Duong, Seabrook (AU); Mark Edward Johnson, Castle Cove (AU); Vishal Vishnoi, Redwood City, CA (US); Balakota Srinivas Vinnakota, Sunnyvale, CA (US); Yu-Heng Hong, Carlton (AU); Elias Luqman Jalaluddin, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1003 days.

(21) Appl. No.: 17/217,623

(22) Filed: Mar. 30, 2021

(65) Prior Publication Data

US 2021/0304075 A1    Sep. 30, 2021

Related U.S. Application Data

(60) Provisional application No. 63/002,151, filed on Mar. 30, 2020.

(51) Int. Cl.
*G06N 20/00*    (2019.01)
*G06F 16/906*   (2019.01)
(Continued)

(52) U.S. Cl.
CPC .......... *G06N 20/00* (2019.01); *G06F 16/906* (2019.01); *G06F 18/22* (2023.01);
(Continued)

(58) Field of Classification Search
None
See application file for complete search history.

(56) References Cited

U.S. PATENT DOCUMENTS 7,853,451 B1 *  12/2010  Gupta ................... G10L 15/063
                                                        704/275
10,453,117 B1 * 10/2019  Reavely ................ G06N 5/027
(Continued)

OTHER PUBLICATIONS

Fernández, et al., "SMOTE for Learning from Imbalanced Data: Progress and Challenges, Marking the 15-year Anniversary", *Journal of Artificial Intelligence Research* 61 (2018) 863-905, Apr. 2018.
(Continued)

*Primary Examiner* — Ryan Barrett
(74) *Attorney, Agent, or Firm* — Kilpatrick Townsend & Stockton LLP

(57) ABSTRACT

The present disclosure relates to chatbot systems, and more particularly, to batching techniques for handling unbalanced training data when training a model such that bias is removed from the trained machine learning model when performing inference. In an embodiment, a plurality of raw utterances is obtained. A bias eliminating distribution is determined and a subset of the plurality of raw utterances is batched according to the bias-reducing distribution. The resulting unbiased training data may be input into a prediction model for training the prediction model. The trained prediction model may be obtained and utilized to predict unbiased results from new inputs received by the trained prediction model.

20 Claims, 8 Drawing Sheets

(51) Int. Cl.
*G06F 18/22* (2023.01)
*G06F 18/2413* (2023.01)
*G06F 40/30* (2020.01)
*G10L 15/06* (2013.01)
*G10L 15/18* (2013.01)
*G10L 15/197* (2013.01)
*G10L 15/22* (2006.01)

(52) U.S. Cl.
CPC ........ *G06F 18/24147* (2023.01); *G06F 40/30* (2020.01); *G10L 15/063* (2013.01); *G10L 15/1815* (2013.01); *G10L 15/197* (2013.01); *G10L 15/22* (2013.01)

(56) References Cited

U.S. PATENT DOCUMENTS

| | | | | |
|---|---|---|---|---|
| 2012/0262461 | A1* | 10/2012 | Fisher | G06F 40/274 |
| | | | | 345/467 |
| 2016/0055262 | A1* | 2/2016 | Bhattacharjee | G06F 16/90344 |
| | | | | 707/722 |
| 2018/0247648 | A1 | 8/2018 | Nadimpalli et al. | |
| 2019/0066670 | A1* | 2/2019 | White | G10L 15/22 |
| 2019/0217206 | A1 | 7/2019 | Liu et al. | |
| 2019/0295537 | A1* | 9/2019 | Sapugay | G10L 15/19 |
| 2020/0090638 | A1 | 3/2020 | Ugrani et al. | |
| 2020/0142960 | A1* | 5/2020 | Shah | G06N 20/00 |
| 2020/0257856 | A1* | 8/2020 | Peper | G06N 20/00 |
| 2022/0171938 | A1* | 6/2022 | Jalaluddin | G06F 40/30 |

OTHER PUBLICATIONS

Horev; Rani, "Identifying and Correcting Label Bias in Machine Learning", *Towards Data Science*, Feb. 9, 2019, 6 pages.

Jiang, et al., "Identifying and Correcting Label Bias in Machine Learning", *Computer Science > Machine Learning, Cornell University*, arXiv:1901.04966v1, Jan. 2019.

Prost, et al., "Debiasing Embeddings for Reduced Gender Bias in Text Classification", *Computer Science > Machine Learning, Cornell University*, arXiv:1908.02810v1, Aug. 2019, 7 pages.

International Application No. PCT/US2021/024946 received an International Search Report and Written Opinion, Mailed On Jul. 13, 2021, 10 pages.

International Application No. PCT/US2021/024946 , "International Preliminary Report on Patentability", Oct. 13, 2022, 7 pages.

* cited by examiner

BATCHING TECHNIQUES FOR HANDLING UNBALANCED TRAINING DATA FOR A CHATBOT

CROSS-REFERENCE TO RELATED APPLICATION

The present application is a non-provisional application of, and claims the benefit and priority under 35 U.S.C. 119 (e) of U.S. Provisional Application No. 63/002,151, filed Mar. 30, 2020. The entire disclosure of the aforementioned application is incorporated by reference herein in its entirety for all purposes.

COPYRIGHT

A portion of the disclosure of this patent application contains material which is subject to copyright protection. The copyright owner has no objection to the facsimile reproduction by anyone of the patent application or the patent disclosure, as it appears in the Patent and Trademark Office patent file or records, but otherwise reserves all copyright rights whatsoever.

TECHNICAL FIELD

The present disclosure relates to chatbot systems, and more particularly, to batching techniques for handling unbalanced training data when training a model such that bias is reduced or removed from the trained machine learning model when performing inference determinations.

BACKGROUND

Service providers around the world utilize instant messaging chat platforms in order to communicate with customers of their service. Providers often use these instant messaging chat platforms to engage with customers, resolve problems, or fulfill requests. For example, a customer of a service may describe a problem that the customer is experiencing, and a respondent for the service may describe steps to remedy the problem during a live conversation. In another example, a customer may make a request to the respondent as part of a live conversation in order to utilize some aspect of the service. It can be very costly for providers to employ human respondents to facilitate live communications with customers or end users. Training human employees to handle the various features offered by a provider is time-intensive, and the ability to converse live with customers may be limited during certain periods of time, especially if the service runs at all hours of a day.

Chatbot systems offer a variety of techniques for managing interactions between an entity, such as a customer, and a service. Service providers may utilize chatbots to communicate with customer entities to eliminate the costly and time-consuming manual interactions typically performed between two humans. A chatbot system may utilize textual recognition techniques to identify and respond to certain cues and contexts inherent to a live conversation with a customer entity. An intelligent chatbot, typically highly refined through training, can communicate more naturally with customers during live conversations. This provides a streamlined and pleasant conversational experience for customers, while utilizing a service's resources efficiently. Intelligent chatbot systems may be continuously refined by regularly training the chatbot with comprehensive training inputs. Continuous training of a chatbot causes the bot to constantly improve its ability to interact with customer entities, and also allows the bot to remain flexible through training with fresh and relevant use cases.

A chatbot system is heavily influenced by the quality of material it is trained with. For example, training a chatbot system with a higher amount of training data typically allows the chatbot to learn more contextually complex behaviors, and respond to a greater range of interactive situations. A grouping, or "batch," of quality training materials will permit a chatbot to learn functions efficiently, and provide higher quality interactions with a customer entity. However, a chatbot may also learn poor behaviors when less-optimal training data is provided. For example, providing a batch of unbalanced feedback to the chatbot system, such as training data having a high number of training examples significantly biased towards a certain interactive context, will cause it to learn biased behaviors over time. Biased behaviors may cause a chatbot system to engage in inefficient or incorrect interactions with an entity. These actions include interacting with the entity in an incorrect context, recommending solutions which do not help a customer entity, and/or wasting crucial resources by incorrectly engaging with unrelated elements of a service. These, and other biased chatbot interactions, are harmful to both the service provider, and the interacting entity. It is therefore crucial to provide unbiased and efficient training data batches to a chatbot system when training its interaction model.

BRIEF SUMMARY

Techniques disclosed herein relate generally to chatbots. More specifically and without limitation, techniques disclosed herein relate to techniques for batching training data for training a chatbot system. A chatbot can classify user utterances into different classes, such as predefined intents of interacting users/customers. The classifier of the chatbot may include a trained Machine Learning (ML) model that generates outputs (e.g., intents) based on inputs (e.g., user utterances). When the training data used to train the ML model is not adequate, the chatbot may determine incorrect intents more frequently. Specifically, biased training data, when used to train a chatbot system, will cause the chatbot to exhibit biased and ineffective behaviors. Techniques disclosed herein will allow for batching effective and unbiased training data together so that the batch may be used to train a chatbot. The generation of unbiased training batched greatly reduces or eliminate bias, which would otherwise be ingrained into the chatbot's learned behavior. Elimination of bias in a chatbot's model allows chatbot systems to be trained in a most effective and resource-efficient manner. For example, by eliminating bias at the training level, services utilizing chatbots may prevent poor interactive behavior before it is learned, saving valuable time and resources that would otherwise be spent retraining the chatbot. The elimination of biased behavior at the training level will also prevent customer complications that would otherwise ensue when the poorly-trained chatbot is operating.

Various embodiments are described herein, including methods, systems, non-transitory computer-readable storage media storing programs, code, or instructions executable by one or more processors, and the like. In chatbot systems, a training set of utterances is used for training an intent classifier for identifying one or more intents for one or more utterances. An utterance may be an expected interaction with an entity, such as a string of conversational words. An intent may be a contextual category of an interaction which is inherent to an utterance. An intent classifier may be a tool for identifying the correspondence between an utterance and a categorical intent. The intent classifier may be a model that is designed to be iteratively trained to more efficiently identify corresponding intents of particular utterances. The training set of utterances is provided as a batch of utterances, typically of a particular size, and selected from a set of raw utterance data. In systems which use random sampling to generate such a training batch, an output category of the intent classifier (e.g., a particular intent) which has been trained with more training utterances will be selected by the intent classifier more often than an output category with fewer training utterances, even if both categories match an input utterance equally well.

Accordingly, such systems may suffer from bias when training the inter classifier during future training and also when interacting with an entity. These biases often occur when the training data contains a disproportionate amount of training utterances for a particular output categories compared to other output categories. The current disclosure resolves this bias using techniques for balancing the training batches used to train the intent classifier. More particularly, the system utilizes an intent distribution to generate a distributed and unbiased training batch. This ensures that an intent classifier trained on the distributed unbiased training batch will utilize each output category more equally and reduce inefficient biases inherent to previous random-sampling methods.

One embodiment is directed to a method comprising obtaining training data comprising a plurality of utterances, wherein each utterance corresponds to an intent of a plurality of intents, and each intent of the plurality of intents corresponds to a skill of one or more skills; determining an intent distribution across the plurality of utterances, wherein the intent distribution comprises a plurality of intent proportions, and each of the intent proportions correspond to an intent of the plurality of intents; generating a batch, the batch comprising a batch number of utterances selected from the plurality of utterances based on the plurality of intent proportions; iteratively inputting sets of training data from the batch into a prediction model for the one or more skills, wherein the prediction model is constructed as an intent classifier comprising a plurality of model parameters learned by use of an objective function; training the prediction model on the sets of training data by minimizing or maximizing the objective function, which measures a difference between predicted intents and ground truth intents; in response to the training, learning relationships within the sets of training data that are used by the prediction model to generate the predicted intents; and obtaining a trained prediction model comprising the plurality of model parameters associated with the learned relationships. Another embodiment is directed to a system comprising one or more data processors and a non-transitory computer-readable storage medium to perform operations including the method described above. Yet another embodiment is directed to a non-transitory computer-readable storage medium storing a plurality of instructions executable by one or more processors, which, when executed by the one or more processors, cause performance of the steps of the method described above.

These illustrative embodiments are mentioned not to limit or define the disclosure, but to provide examples to aid understanding thereof. The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs. The words "based on" as used herein are not necessarily to be construed as implying an exclusive requirement for an action, and any such action may be interpreted to be based at least on in part on the requirement following these words, without exclusivity.

1.0 Example Chatbot System Overview

Figure 1:
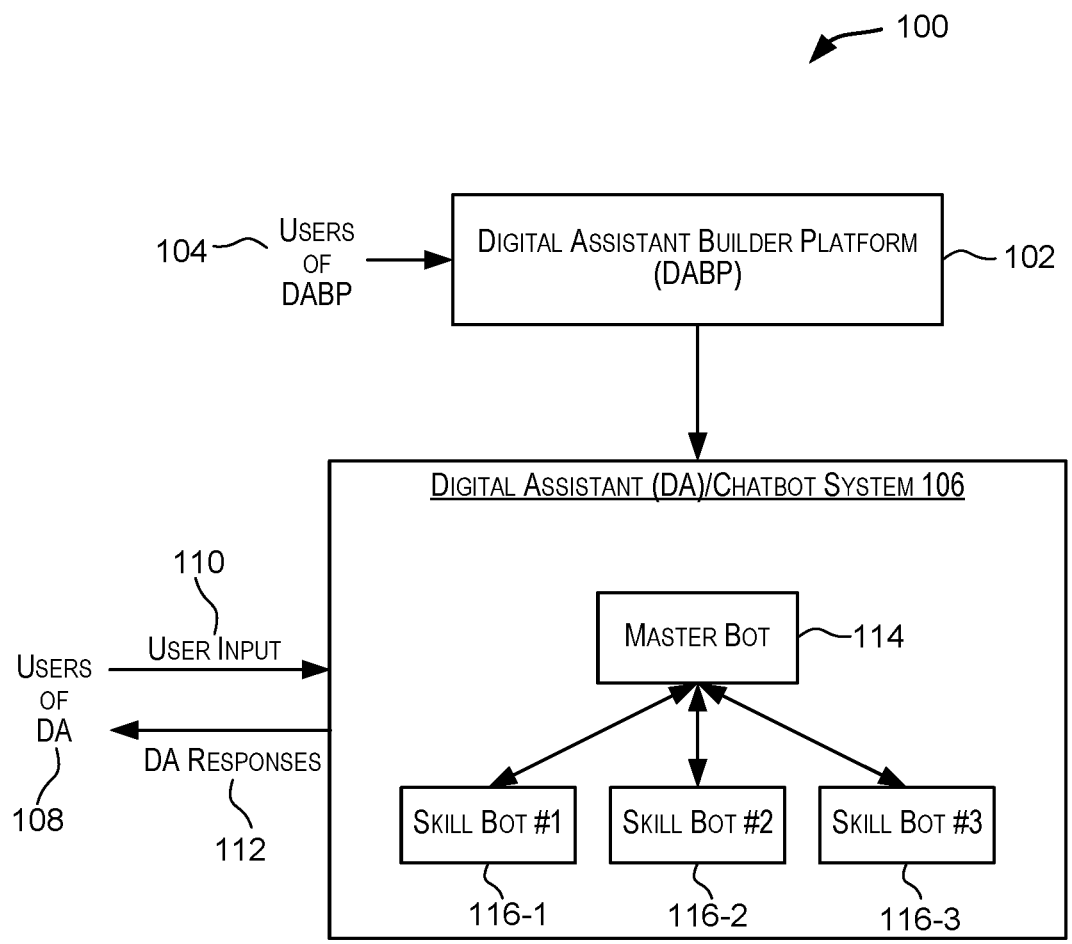
FIG. 1 depicts a simplified diagram of a chatbot system according to certain embodiments.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself.

In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
 (1) Configuring settings for a new skill bot
 (2) Configuring one or more intents for the skill bot
 (3) Configuring one or more entities for one or more intents
 (4) Training the skill bot
 (5) Creating a dialog flow for the skill bot
 (6) Adding custom components to the skill bot as needed
 (7) Testing and deploying the skill bot
Each of the above steps is briefly described below.
 (1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot-DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

2.0 Example Batching Systems

Figure 2:
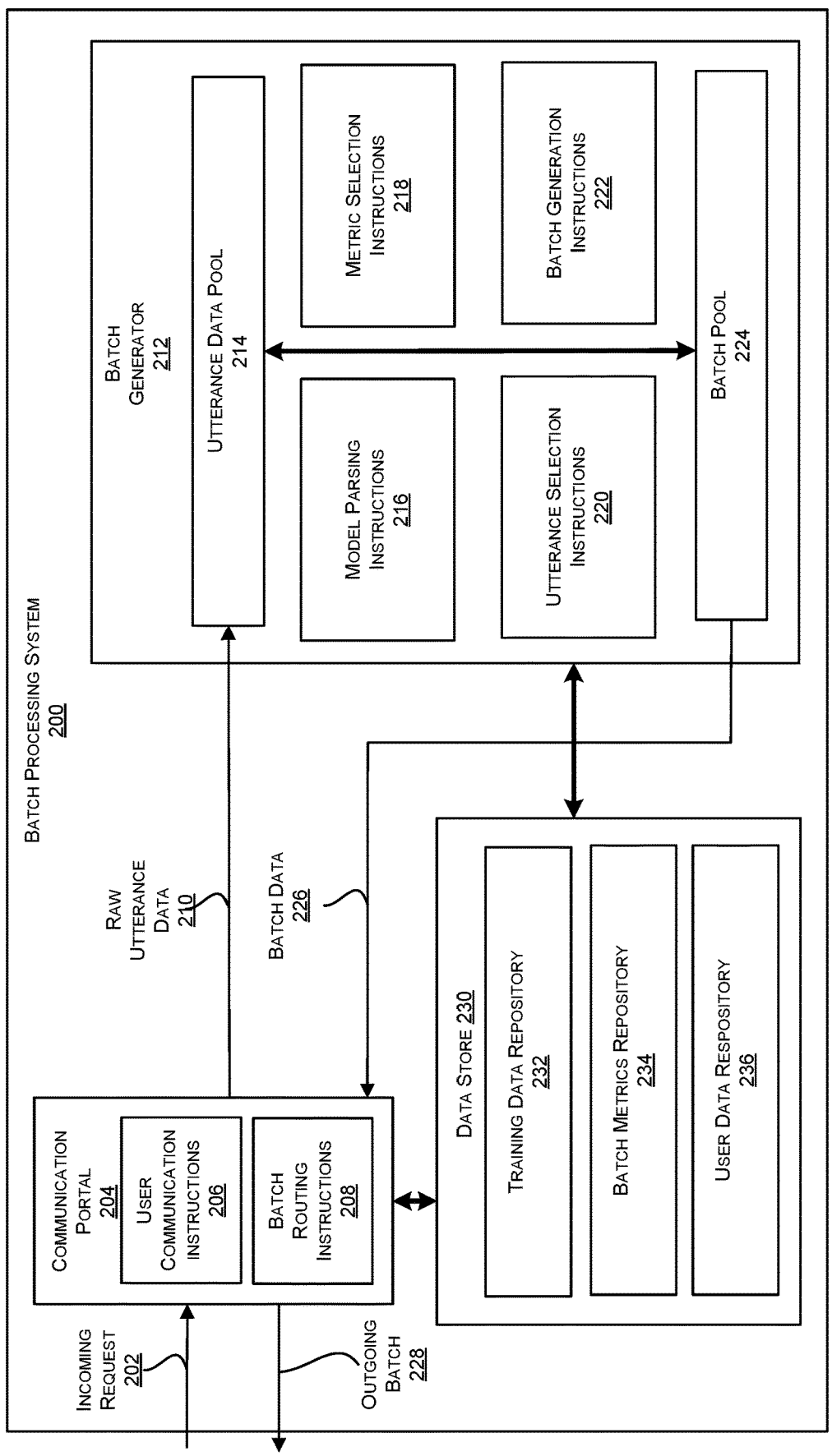
FIG. 2 depicts a block diagram of an example batch processing system according to certain embodiments.

FIG. 2 depicts a block diagram of an example batch processing system according to certain embodiments. Specifically, FIG. 2 depicts a batch processing system 200 comprising elements for batching training data for training a chatbot according to various embodiments. Batch processing system may receive incoming request 202. Incoming request 202 may be a request comprising data for generating a batch of training data. Incoming request 202 may be a batch generation request comprising raw utterance data including a plurality of proposed training utterances. For example, batch processing system 200 may be a system operated by a chatbot service. A customer of the chatbot service may send a plurality of training utterances to batch processing system 200 to obtain training data for training a chatbot for to handle a customer's interactions.

Incoming request 202 may be received at communication portal 204. Communication portal 204 may be an entity within batch processing system 200 for handling incoming and outgoing data. Communication portal 204 may comprise user communication instructions 206, which determine one or more manners in which communication portal 204 may interact with a user sending data to, and receiving data from, batch processing system 200. Communication portal 204 may further comprise batch routing instructions 208, which determine where incoming requests and/or data associated with incoming requests are routed within batch processing system 200. For example, batch routing instructions 208 may be executed to determine one or more batch generation modules within batch processing system 200 which will generate batched training data according to the incoming request 202.

In various embodiments, once communication portal 204 has determined a batch generating entity within batch processing system 200 to batch training data, the communication portal may forwarding raw utterance data 210 from incoming request 202 to a batch generator 212. Batch generator 212 may be an entity within batch processing system 200 for batching training data for training a chatbot. Batch generator 212 may comprise utterance data pool 214. Utterance data pool 214 may be a storage location within batch processing system 200 which stores raw utterance data and sorts utterances based on a determined associated output category. For example, batch generator 212 may receive raw utterance data 210 at utterance data pool 214 and sort the raw utterance data into intent pools based on intents corresponding to each utterance in the raw utterance data.

Batch generator 212 may further comprise instructions for generating a batch based on the raw utterance data, such as model parsing instructions 216. Model parsing instructions 216 may be instructions for parsing a training model associated with a chatbot to determine one or more aspects of the model. For example, model parsing instructions 216 may cause parsing of a training model to determine a plurality of skills and/or intents, which are known to the model. Batch generator 212 may comprise metric selection instructions 218. Metric selection instructions 218 may be instructions for selecting a metric for generating a batch of training data. For example, based on parsed information about a chatbot training model, metric selection instructions 218 may cause selection of a metric or distribution for proportional batching of the training utterances in a batch. Batch generator 212 may comprise utterance selection instructions 220, which are instructions for selection a number of utterances from the utterance pool 214 for batching based on a selected distribution metric. Batch generator 212 may comprise batch generation instructions 222, which may be instructions for how to batch the number of selected utterances into one or more training batches. For example, batch generation instructions 222 may generate batch data comprising a number of selected utterances for each batch.

The batch data may be stored in a repository within batch generator 212, such as batch pool 224. Generated batch data such as batch data 226 may then be sent back to communication portal 204 before being exported as outgoing batch 228 for training a chatbot model. Batch processing system 200 may further comprise data store 230. Data store 230 may contain any number of entities, repositories, or instructions for implementing the processes described herein, and may be coupled to any of the system entities described above. Data store 230 may comprise training data repository 232, which may be a repository containing additional raw or synthetic training data utilized by the batch processing system 200 to generate training data batches. Data store 230 may comprise batch metrics repository 234, which may be a repository of metrics or models used to determine an intent distribution for batching the number of utterances. Data store 230 may comprise user data repository 236, which may be a repository of user or customer data that can be used as part of the batch generation process. For example, user data repository 236 may contain a number of known user chatbot models for parsing according to model parsing instructions 216.

It will be appreciated by one having ordinary skill in the art that the systems and entities depicted in FIG. 2 may be rearranged in any fashion or configuration which allows for the batching of training data according to the embodiments described herein.

3.0 Example Batching Processes and Techniques

Batching techniques are described for handling unbalanced training data when training a model such that bias is removed from the trained machine learning model when performing inference. In certain embodiments, batching techniques are described for resolving bias in predictions made by models (e.g., intents inferred by a trained intent classifier for input utterances) using techniques for balancing batches of training data. For example, a skill bot may be trained to infer an intent from a set of intents for an utterance. The training data used to train the skill bot can include examples of utterances, and for each utterance, an intent associated with the utterance. The training data may be biased when the number of training utterances for one intent is far greater than the number of training utterances for another intent. When such training data is used to train a model, the resultant trained model is biased towards inferring the intent with the higher number of training utterance examples. For example, a skill having two intents may be trained on 1000 training utterances. 950 training utterances may correspond to intent one, and 50 training utterances may correspond to intent two. The skill is therefore more highly trained on intent one compared to intent two. Accordingly, an intent classifier of the skill may incorrectly attribute the context of an actual customer utterance to intent one, even when the actual context of the customer utterance corresponds to intent two. This is not desired.

The imbalance can also occur when training a model for selecting a skill bot from among many skill bots, for example when a master bot has to select a particular skill bot for handling an utterance. The available training data for training the master bot may be imbalanced. This again creates an imbalance. When such training data is used to train the master bot, the resultant trained master bot model is biased towards inferring the skill bot with the higher number of training utterance examples learned. For example, two skills, a first skill having two intents, and a second skill having one intent, may be trained on 900 training utterances. Each intent may correspond to 300 training utterances, meaning the intent distribution is balanced. However, the first skill is more highly trainable than the second skill, the former having twice the number of training utterances as the latter. Accordingly, an master skill bot classifier may incorrectly attribute the context of an actual customer utterance to an intent within the first skill, even when the actual context of the customer utterance corresponds to an intent within the second skill. This, again, is not desired. The processes described herein reduce and eliminate these biases when batching utterances for training data.

Figure 3:
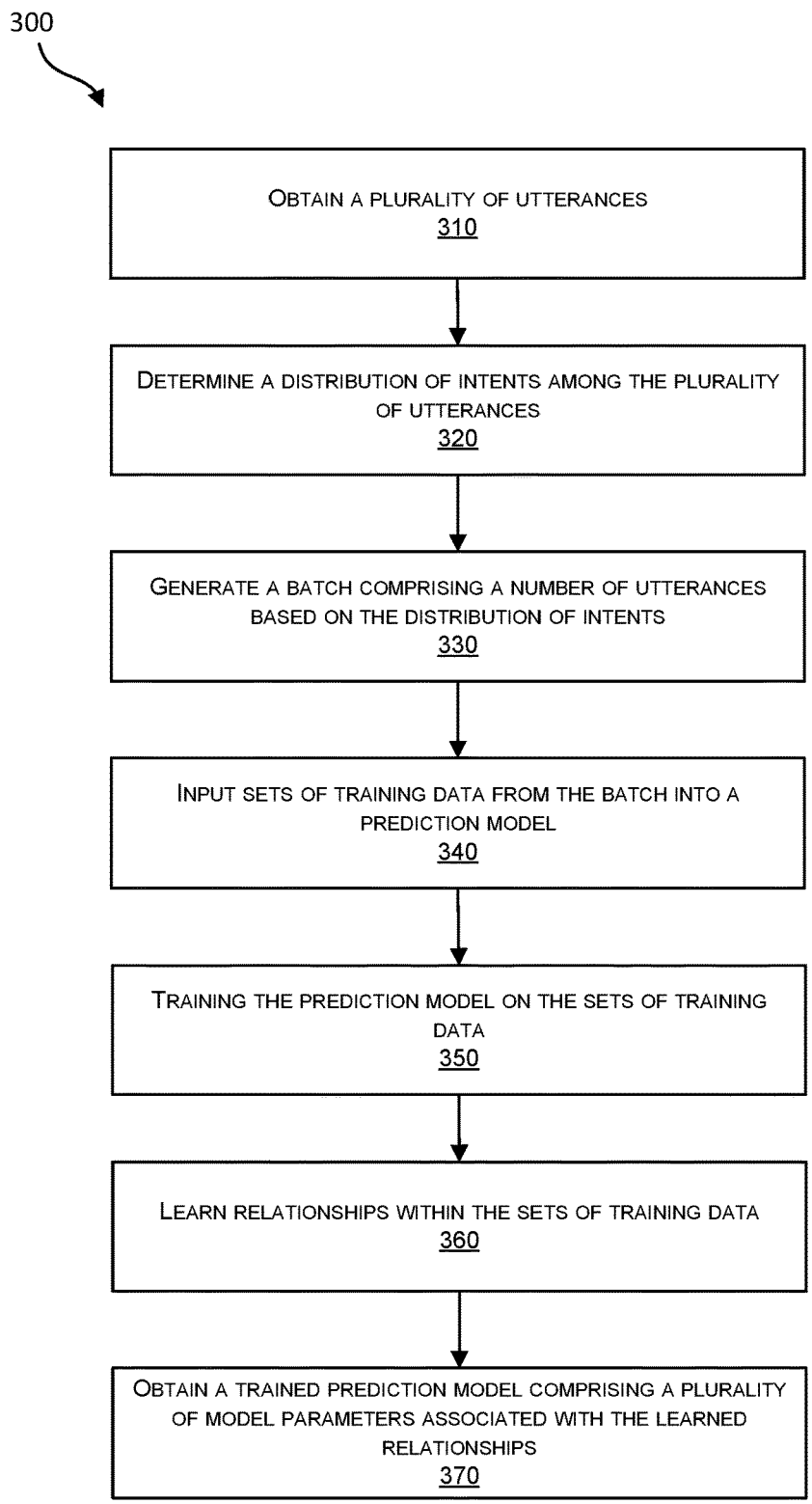
FIG. 3 depicts an example process for generating a training batch and obtaining a prediction model according to certain embodiments.

FIG. 3 depicts an example process for generating a training batch and obtaining a prediction model according to certain embodiments. Specifically, example process 300 depicts a flowchart for generating a reduced-bias training batch of utterances for training a model to obtain a prediction model which may interact in a more efficient manner when implementing chatbot functions. Process 300 begins at step 310 by obtaining a plurality of utterances. The plurality of utterances may be a plurality of raw utterance data which, if trained on a model, would produce a biased resultant trained model. For example, the obtained plurality of utterances may be obtained as part of an incoming request, such as incoming request 202, and may be a proposed plurality of utterances for which bias should be removed before training can proceed.

At step 320, a distribution of intents among the plurality of utterances is determined. The distributions may be determined based on the obtained plurality of utterances, metadata associated with the obtained plurality of utterances, a model on which the plurality of utterances are proposed to be trained, etc. For example, a distribution of intents corresponding to the plurality of obtained utterances may be determined based on relative amounts of each represented intent in the plurality of utterances. In another example, metadata obtained as part of an incoming request may specify one or more desired intent distributions and may be parsed to influence the determination of the distribution. In yet another example, a known user chatbot model may be obtained from a model repository, such as user data repository 236, and instructions, such as model parsing instructions 216, may parse the model to determine a relative distribution of skills and/or intents utilized by the model.

At step 330, a batch comprising a number of utterances is generated based on the distribution of intents. The batch may be generated based on instructions, such as metric instructions 218, utterance selection instructions 220, and batch generation instructions 222. The instructions may specify known subsets of the number of utterances or relative probabilities of subsets of the number of utterances for inclusion in a batch. For example, a static number of utterances corresponding to a particular intent may be automatically selected for inclusion in the batch. In another example, a relative probability of inclusion for a plurality of intents is determined, and utterances corresponding to the plurality of intents are selected at random for inclusion in the batch based on the relative probability distribution of the corresponding plurality of intents.

At step 340, sets of training data from the batch are input into a prediction model. The sets of training data may be subsets of the number of utterances in the generated batch which are systematically input into the prediction model to train the prediction model. In various embodiments, inputting the training data from the batch comprises sending the generated batch to a model generation system which provides the training data from the batch iteratively to the prediction model. At step 350, the prediction model is trained on the set of training data input into the model. The model may be trained according to any of the embodiments discussed herein. For example, the model may comprise an intent classifier which is capable of "learning" differences between a predicted intent based on parsing an utterance and an actual intent corresponding to the utterance. The intent classifier may use these difference to alter parameters or thresholds for intent determination to more closely resemble an ideal model which will predict intents with complete accuracy.

At step 360, the prediction model learns relationships within the sets of training data. The learned relationships may be relationships between one or more aspects of the plurality of utterances and the corresponding intents for the plurality of utterances. For example, an intent classifier of a prediction model may use determined differences between predicted intents and actual corresponding intents to model relationships between aspects of utterances and possible intents corresponding to the utterances. In a further example, the aspects are strings of characters and contextual probability values that are parsed in order to determine an overall predicted context of an utterance. The overall predicted context corresponds to a possible intent based on the relationships learned by the prediction model. At step 370, a trained prediction model compromising a plurality of model parameters associated with the learned relationships is obtained. The trained prediction model may be the prediction model described above after a period of training is completed using the batched training data. In various embodiments, the obtained trained prediction model is utilized to parse non-training utterances and predict a corresponding intent as part of a chatbot service interacting with a user.

3.1 Uniform Batching Techniques

The present disclosure describes novel batching techniques for removing the biases mentioned above, including at least at the intent level. Uniform batching techniques are described at the level of a single master bot and across the distribution of each known intent of the master bot system. For example, a distribution of utterances may correspond uniformly to each intent of a plurality of intents based on the total number of intents in the plurality of intents. Novel batching techniques are used for selecting batches for the model training such that training batches are generated by selecting the appropriate number of training examples from the training data within each output category. This ensures that an intent classifier trained on the batch has a probability of score each output category equally.

By way of example, consider a scenario in which training data is provided for nine different intents (a-i). In this example, training data for the plurality of intent a-i may be unbalanced such that significantly more training examples are available for intent a than the other intents b-i. For example consider that the following training examples are available for each of the respective intents a-i:

Intent a=900 total training utterances
Intents b, c, d=20 training utterances each
Intents e, f, g, h, i=8 training utterances each Assume in this example that a batch of 100 training examples is to be generated for each training run. One skilled in the art would recognize that a simple random sampling of the training data above will result in significantly more training examples for intent a being included within the batch than training examples each of the other intents, since training examples from intent a are nine times more likely to be selected, which would result in a bias toward intent a (in an intent classifier trained using that batch). To correct this, the system may perform a uniform balancing at the intent level. This involves assigning an equal portion of the batch size to each intent so that each intent an equal chance of being chosen. For example, constraints on the training data above may be generated such that:

Intent ratio: 1/(total number of intents)=1/9

Each intent would therefore correspond to a one in nine chance of having a corresponding utterance selected for batching. As would be recognized by one skilled in the art, setting the above constraints on selection of training data would eliminate bias toward any particular intent as each intent would attain an equal probability of inclusion in an eventual batch. In various embodiments when the number of available batch slots is greater than the number of intents, at least one intent may be selected for inclusion in the batch via a corresponding utterance. In various further embodiments, when the number of batch slots in a batch is not equitably dividable among the number of intents, a number of batch slots may be reserved in a subsequent batch for inclusion utterances corresponding to any intents which were not equitably distributed in the first batch. As would be recognized by one skilled in the art, setting the above constraints on selection of training data would eliminate bias toward any particular intent and intent would be equally represented in a batch of training data.

3.2 Hierarchical Batching Techniques

The present disclosure describes novel batching techniques for removing the biases mentioned above, both at the skill bot level and also at the master bot level. Hierarchical balancing techniques are described at the master bot level and at the skill bot level. For example, the training infrastructure perform multi-hierarchical balancing, the multi-hierarchical balancing utilizing first hierarchical balancing at the master bot level between different skill bots and a second hierarchical balancing at the skill bot level between the various intents configured for the skill bot. Novel batching techniques are used for selecting batches for the model training such that training batches are generated by selecting the appropriate number of training examples from the training data within each output category. This ensures that an intent classifier trained on the batch has a probability of score each output category equally.

By way of example, consider a scenario in which training data is provided for two separate skill bots (Skill A and Skill B). In this example, consider that Skill A is associated with a set of five different intents (a-e) and Skill B is associated with a set of four different intents (f-i). In this example, training data for the two skills may be unbalanced, such that more training examples are available for Skill A than for Skill B. For example, consider that the following training examples are available for each of the respective intents of Skill A and Skill B (Key: N (i), where "i" identifies the intent and "N" identifies that number of training utterance examples available in the training set for intent "i"):

Skill A: $5(a)+100(b)+100(c)+295(d)+500(e)=1000$ (total training utterances for skill A)

Skill B: $5(f)+10(g)+25(h)+60(i)=100$ (total training utterances for skill B)

Assume in this example that a batch of 100 training examples is to be generated for each training run. One skilled in the art would recognize that a simple random sampling of the training data above will result in significantly more training examples for Skill A being included within the batch than training examples for Skill B, since training examples from Skill A are ten times more likely to be selected, which would result in a bias toward Skill A (in an intent classifier trained using that batch). To correct this, the system may perform a first hierarchical balancing at the skill level. This involves assigning an equal portion of the batch size to each skill so that Skill A and Skill B have an equal chance of being chosen. For example, constraints on the training data above may be generated such that:

Skill A: $5/2000(a)+100/2000(b)+100/2000(c)+295/2000(d)+500/2000(e)=1/2$

Skill B: $5/200(f)+10/200(g)+25/200(h)+60/200(i)=1/2$

As would be recognized by one skilled in the art, setting the above constraints on selection of training data would eliminate bias toward any particular skill as each skill would be equally represented. However, even within skills, each intent is disproportionately represented. To account for this, the system may perform a second hierarchical balancing at the intent level. This involves assigning an equal ratio to each intent within a particular set of intents for a skill so that they all have an equal chance of being chosen. For example, constraints on the training data above may be adjusted such that:

Skill A: $1/10(a)+1/10(b)+1/10(c)+1/10(d)+1/10(e)=1/2$

Skill B: $1/8(f)+1/8(g)+1/8(h)+1/8(i)=1/2$

As would be recognized by one skilled in the art, setting the above constraints on selection of training data would eliminate bias toward any particular intent within a skill as each intent would be equally represented within the skill. Using the above constraints, an appropriate number of training examples can be calculated for each intent by multiplying the batch size by the portion of the batch assigned to each skill by the ratio for that intent. For example, in calculating an appropriate number of training examples for intent e of Skill A to be included in a batch of 100 training examples, one would multiply the batch size (e.g., 100) by the portion of the batch assigned to each skill (e.g., $1/2$) by the ratio assigned to that intent ($1/10$). In this example $100*1/2*1/10=5$. Accordingly, a batch of 100 training examples would be generated so that it includes five training examples with an output category of intent e of Skill A. When generating the batch, note that the five training examples may be selected randomly from the available training examples for intent e of Skill A.

3.3 Scaled Batching Techniques

The present disclosure describes novel batching techniques for removing the biases mentioned above according to a universal scaled factor. Scaled balancing techniques allow for the advantages of uniform and hierarchical balancing described above and include additional bias control according to a scaled factor or function. For example, the training infrastructure may perform proportional balancing as described above, but may utilize proportions and probabilities scaled according to a defined function provided by a user of a model or an administrator of a model. The scaling factor allows certain characteristics of a plurality of raw training utterances to be maintained while simultaneously reducing harmful bias.

By way of example, consider a scenario in which training data is provided for five separate intents, intents a-e. In this example, consider that intent "a" is an intent corresponding to a main use case of a model, and is expected to be correlated with about one-third of all utterances parsed by a model. In this example, training data for the five intents may be unbalanced, such that far more training examples are available for intent "a" than for intents b-e. For example, consider that the following training examples are available for each of the respective intents:

Intent a=100 total training utterances
Intent b=30 total training utterances
Intent c=20 total training utterances
Intent d=10 total training utterances
Intent e=5 total training utterances Assume in this example that a batch of 100 training examples is to be generated for each training run. One skilled in the art would recognize that a simple random sampling of the training data above will result in significantly more training examples for intent a being included within the batch than training examples for each of the other intents, since training examples from intent "a" are at least 3 times more likely to be selected than any other intent individually, which would result in a bias toward intent a (in an intent classifier trained using that batch). However, because intent "a" is a main use case and should be expected to be selected about one-third of the time when parsing an utterance, uniform batching techniques may eliminate this feature entirely when training intent "a" equally with each other intent. To correct the existing bias while maintaining a degree of similarity with the original distribution, the system may perform a scaled batching. This involves assigning an portion of the batch size to each intent according to a functional transformation of the data so that each intent will have a contextually correct chance of being chosen for the batch. For example, a logarithmic scaling technique may transform constraints on the training data above such that:

Biased Raw Utterance Distribution$(x)$=[100,30,20,10, 5]

Logarithmic Distribution=$\log(x)/\text{sum}(\log(x))$=[0.31, 0.23,0.20,0.15,0.11]

As would be recognized by one skilled in the art, setting the above constraints on selection of training data would reduce bias toward any particular intent that was overrepresented in the raw utterance pool provided. However, each intent may still be proportionally represented according to a relative importance for a model which will be trained on the data. For example, knowing that intent "a" is ideally expected to be chosen as corresponding to an utterance about one-third of the time during operation of a model, the following distributions of proportional selection for intent "a" can be compared:

Raw Utterance Training $(a)$=100/(100+30+20+ 10+5)=~3/5

Uniform Batching $(a)$=1/5

Logarithmic Distribution $(a)$=~1/3

The logarithmically-scaled batching techniques described above therefore reduce the bias inherent to the raw training data while maintaining a relative training importance accorded to intent "a," which may be valuable to a model. As would be recognized by one skilled in the art, the logarithmic scaling function techniques described above are only one example of scaling techniques for batching training data, and any transformation, function, or scaling techniques may be used in addition to, or in lieu of, this particular technique.

3.4 Weighted Batching Techniques

The present disclosure describes novel batching techniques for removing the biases mentioned above according to a weighted distribution. Weighted distribution techniques allow for the advantages of uniform and hierarchical balancing described above and include additional bias control according to a specified weighted distribution. For example, the training infrastructure may perform proportional balancing as described above, but may utilize a separate distribution of weights provided by a user of a model or an administrator of a model. The weight distribution allows certain characteristics of a plurality of raw training utterances to be maintained while simultaneously reducing harmful bias.

By way of example, consider the scenario presented in the scaled batching techniques scenario described above in which training data is provided for five separate intents, intents a-e, such that:

Biased Raw Utterance Distribution $x$=[100,30,20,10, 5]

Assume in this example that a batch of 100 training examples is to be generated for each training run. One skilled in the art would recognize that a simple random sampling of the training data above will result in significantly more training examples for intent a being included within the batch than training examples for each of the other intents, since training examples from intent "a" are at least 3 times more likely to be selected than any other intent individually, which would result in a bias toward intent a (in an intent classifier trained using that batch). However, a customer or service may provide a distribution of weights which correspond to relative distribution of importance for the training of certain intents. In an example, a customer may provide a weighted distribution according to the relative importance of intent recognition for a model. In another example, a service maintaining the models on a customer's behalf may parse the model which will receive the batch training data as input to determine an expected relative importance of certain intents relative to other intents. For example, a customer may send a weighted distribution to a batching system describing relative importance of weights ranging from 0 to 1 according to the customer such that:

Weighted Importance Distribution $y$=[0.4,0.3,0.3,0.1, 0.1]

The batching techniques may apply the weighted distribution to another of the batching techniques described herein to form a composite weighted batching distribution. For example, the weighted distribution may be used to transform a uniform distribution to form a weighted-uniform distribution, such as:

Weighted Uniform Distribution=$(x*y)/\text{sum}(x*y)$= [(0.2*0.4),0.2*0.3),(0.2*0.3),(0.2*0.1), (0.2*0.1)]/0.24=[0.33,0.25,0.25,0.08,0.08]

As would be recognized by one skilled in the art, setting the above constraints on selection of training data would reduce bias toward any particular intent which was overrepresented in the raw utterance pool provided. However, each intent may still be proportionally represented according to a relative importance for a model which will be trained on the data as specified by a given weight distribution. For example, knowing that intent "a" is given a relative weight of 0.4 in the weight distribution, and given that the sum of the specified weight distributions is a total of 1.2, the following probable representation of intent "a" in a batch is given according to the following techniques:

Raw Utterance Training $(a)$=100/(100+30+20+ 10+5)=~3/5

Uniform Batching $(a)$=1/5

Weighted Distribution $(a)$=~1/3

The weighted distribution batching techniques described above therefore reduce the bias inherent to the raw training data while maintaining a relative training importance accorded to intent "a," which may be valuable to a model. As would be recognized by one skilled in the art, the addition of the weighted distribution function to the existing uniform batching techniques described above are only one example of composite weighting techniques for batching training data, and any transformation, function, or scaling techniques may be used in addition to or in lieu this particular technique.

3.5 Tailed Batching Techniques

The present disclosure describes tailed batching techniques for removing the biases mentioned above, while allowing training for at least each intent included in a master bot model. Tailed balancing techniques will allow for a composite approach for proportional and static representation of intents in a batch which allows for at least a certain number of utterances to be included in a batch and remaining batch slots can be filled proportionally. For example, novel tailed batching techniques are used for selecting batches for the model training such that any intent having a selection probability below a certain threshold will be included in a minimum capacity in a generated batch. This ensures that each intent is represented in a batch, but that the batch is still predominantly proportionally determined.

By way of example, consider a scenario in which training data is provided for six intents a-f. The represented intents may distributed across a raw plurality of utterances in the following matter:

Intent Distribution=[100,50,45,3,1,1]

Assume in this example that a batch of 25 training examples is to be generated for each training run. One skilled in the art would recognize that a simple random sampling of the training data above will result in significantly more training examples for intent "a" being included within the batch than training examples for intents "d," "e," and "f." To correct this, the system may perform a proportional balancing techniques to reduce bias at the intent level. However, batching using techniques such as uniform proportional balancing would assign the same selection probability to intent "f" as intent "a," despite intent "a" being represented one hundred times more in the raw utterance data. To eliminate bias to overly represented utterances without reducing efficiency by proportionally selecting relatively small utterance pools, a tailed batching technique will allow for including minimum training utterances in a batch when the proportional representation of the batch is less than a threshold amount. For example, a particular utterance falling below a certain threshold for probability of selection will be automatically included in a batch in a minimum amount. All remaining utterances at or above the threshold may then be distributed among the batch according to proportional selection techniques. For example, raw probabilities from the raw utterance data above would correspond to the following distribution:

Raw Utterance Training Distributions=[0.5,0.25,0.23, 0.01,0.05,0.05]

Given a tailed threshold of 0.01, each of intents a-d would meet or exceed the tailed threshold and each of intents e and f would be below the tailed threshold. Techniques may specify that any intent falling below the threshold should cause at least one corresponding utterance to be included in any batch of training data. In this case, one utterance corresponding to intents e and f would be included in a slot in the 25 total batch utterances. The remaining 23 utterances would be filled proportionally among the remaining four intents. An example distribution for a batch generated using tailed batching techniques may be:

Training Batch Intent Representations=[11,6,5,1,1,1]

As would be recognized by one skilled in the art, setting the above constraints on selection of training data would eliminate bias toward any particular intent. However, intents that would normally almost never be selected using proportional techniques may be represented in a batch without requiring over-representation of these less-represented intents in the batch.

3.6 Automated-Mixing Batching Techniques

In various embodiments, two or more of the techniques described herein may be used to batch one or more training utterances for training a model. In various embodiments, two or more techniques may be combined to batch multiple training batches. In various embodiments, a first singular technique may be used to generate a first batch, a second singular technique may be used to generate a second batch, and the first and second batches may be combined in a composite batch. In various embodiments, the techniques described herein may be provided as parameters to a hyper-tuner entity for determining a best batching technique for a particular raw utterance dataset. For example, a hyper-tuner may run multiple interactions of batching techniques for the same raw utterance dataset and compare the resulting batches to determine a most efficient batching style. The hyper-tuner may itself be a model which can be trained using input training data to iteratively determine and learn best batching practices according to a number of metrics and techniques available to the hyper-tuner and an input set of raw utterances.

4.0 Additional Example Batching Embodiments

Figure 4A:
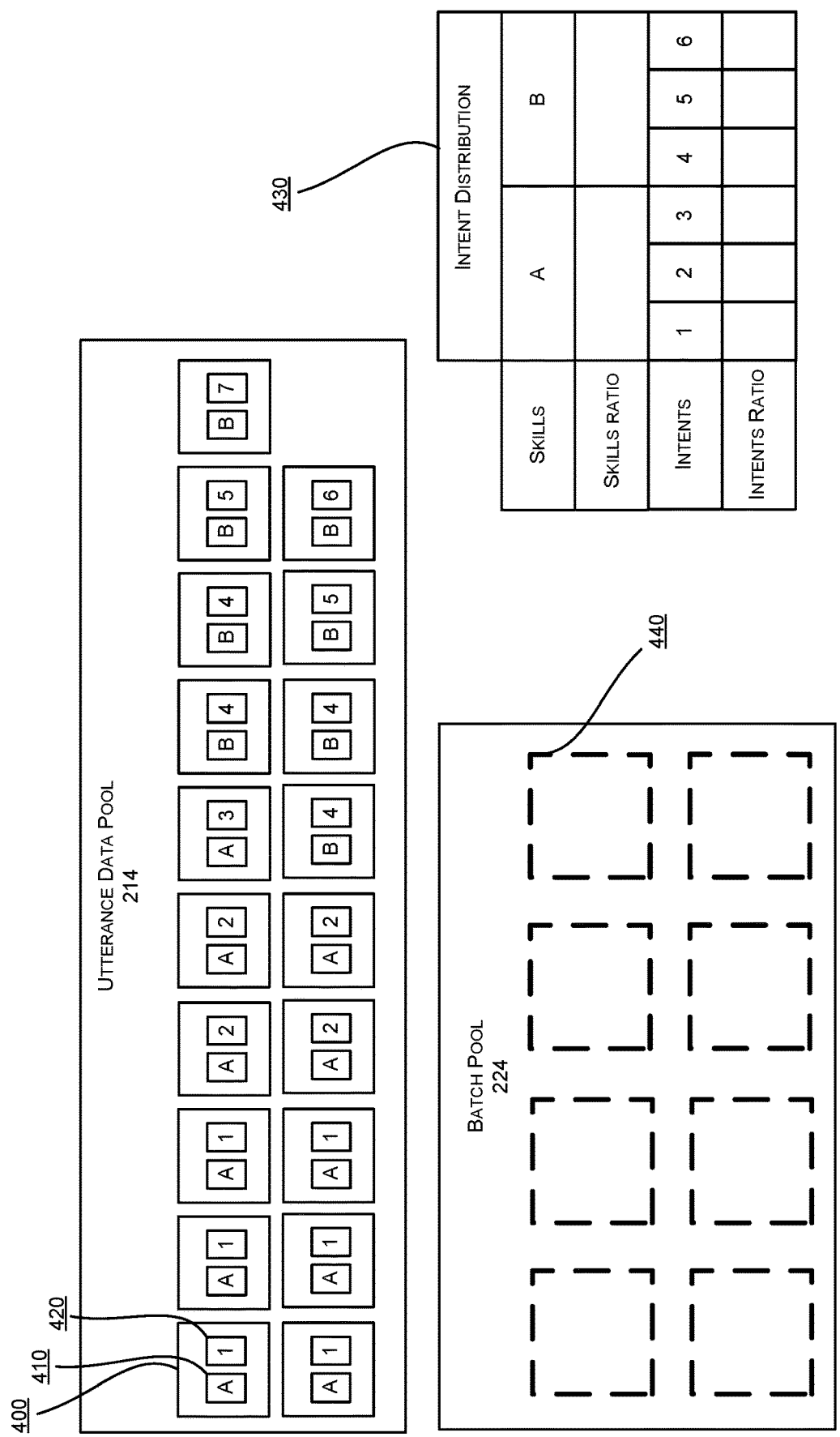
FIG. 4A depicts an example embodiment for generating a training batch from a training data pool according to certain embodiments.

FIG. 4A depicts an example embodiment for generating a training batch from a training data pool according to certain embodiments. Specifically, FIG. 4A depicts an environment prior to generating a batch of training data using the hierarchical batching techniques described herein. As depicted in FIG. 4A, a data pool such as utterance data pool 214 contains a plurality of raw utterances. A raw utterance, such as utterance 400, may comprise metadata corresponding to a skill and/or a intent which known to correspond to the utterance. For example, utterance 400 comprises skill metadata 410 signifying that utterance 400 corresponds to a skill "A." Utterance 400 further comprises intent metadata 420 signifying that the utterance 400 corresponds to intent "1" within skill "A." In various embodiments not depicted in FIG. 4A, an utterance, such as utterance 400, may further comprise metadata corresponding to a weight for a corresponding utterance, skill, or intent, to be used as part of a weighted batching technique as described herein.

Intent distribution 430 is depicted in FIG. 4A as a chart displaying possible skill and intent correspondences between the ratios. Though intent distribution 430 is depicted as a simplified table in FIG. 4A, one having ordinary skill in the art will recognize that an intent distribution may take any form necessary to perform or aid in performance of the processes described herein. A pool of batched data, such as batch pool 224, may comprise batch slot 440. Batch slot 440 may be a subset of storage within batch pool 224 which will accept an utterance as part of a batching process.

Figure 4B:
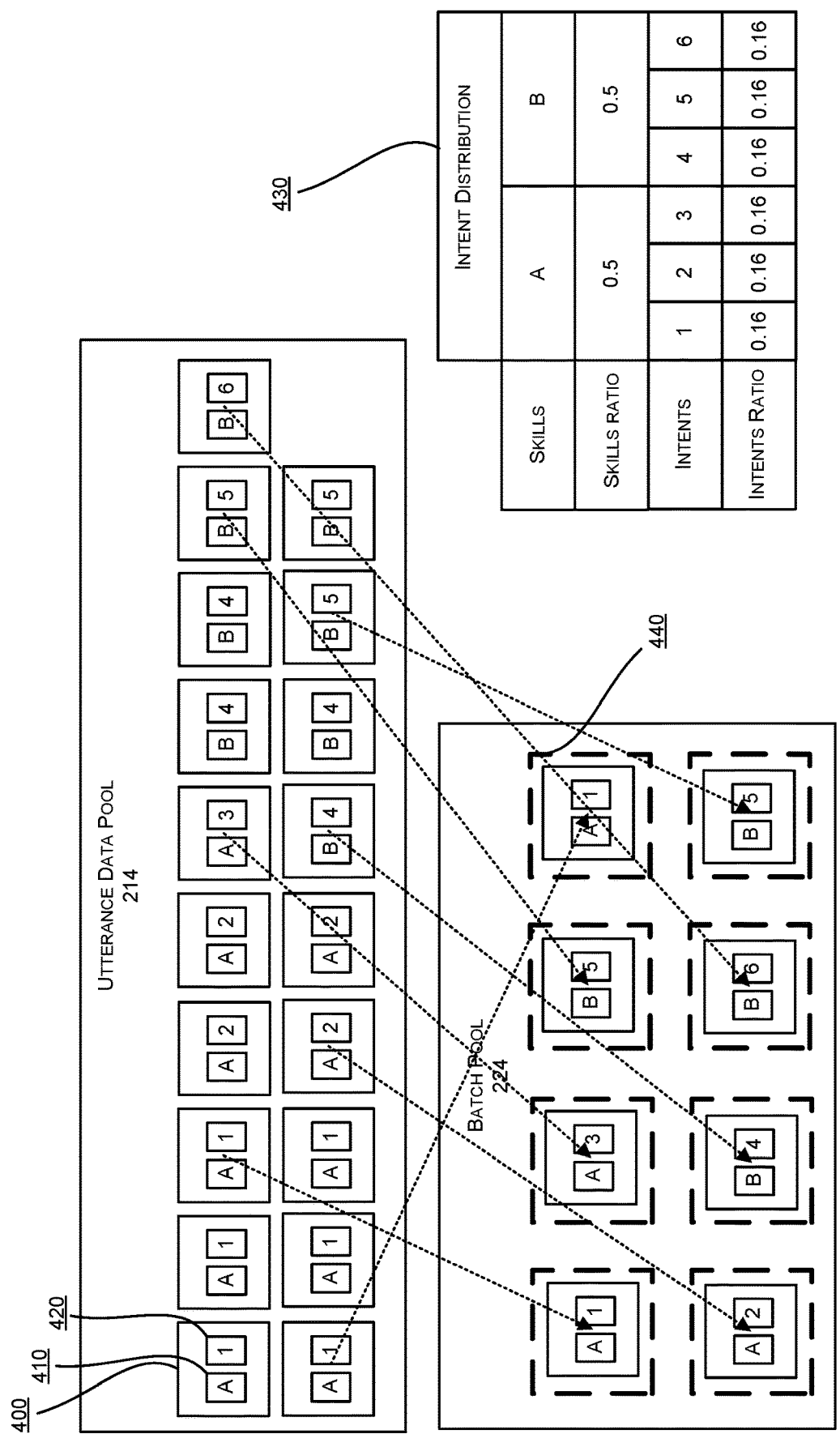
FIG. 4B depicts an example embodiment for generating a training batch from a training data pool according to certain embodiments.

FIG. 4B depicts an example embodiment for generating a training batch from a training data pool according to certain embodiments. Specifically, FIG. 4B depicts an environment subsequent to generating a batch of training data using the hierarchical batching techniques described herein. As depicted in FIG. 4B, a number of utterances from utterance data pool 214 have been selected and copied into the batch slots in the batch pool 224. Intent distribution 430 is updated to comprise ratio information for the number of skills and the number of intents for each skill. For example, the intent distribution for each skill, "A" and "B," comprises a corresponding skill ratio of "0.5" for each skill representing an even distribution of utterance probabilities across the number of skills. The intent distribution is further broken down into intent ratios for each intent of each skill. For example, each of intents "1," "2," and "3" evenly split the "0.5" ratio of skill "A" among the intent ratios for an equal intent ratio of "0.16." The numbers of similar for skill "B," which also contains the three intents "4," "5," and "6."

FIG. 4B depicts an example embodiment for generating a training batch from a training data pool according to certain embodiments. Specifically, FIG. 4B depicts an environment subsequent to generating a batch of training data using the hierarchical batching techniques described herein. As depicted in FIG. 4B, a number of utterances from utterance data pool 214 have been selected and copied into the batch slots in the batch pool 224. Intent distribution 430 is updated to comprise ratio information for the number of skills and the number of intents for each skill. For example, the intent distribution for each skill, "A" and "B," comprises a corresponding skill ratio of "0.5" for each skill representing an even distribution of utterance probabilities across the number of skills. The intent distribution is further broken down into intent ratios for each intent of each skill. For example, each of intents "1," "2," and "3" evenly split the "0.5" ratio of skill "A" among the intent ratios for an equal intent ratio of "0.16." The numbers of similar for skill "B," which also contains the three intents "4," "5," and "6."

As depicted in FIG. 4B, the number of batch slots is greater than the number of intents recorded in the intent distribution. In this case, batching may comprise including at least one utterance corresponding to each of the intents in the batch pool. For example, utterances comprising intent metadata corresponding to each of intents "1," "2," "3," "4," "5," and "6" are randomly selected from the utterance data pool 214 to fill the batch slots. The remaining batch slots are then less than the number of intents. Accordingly, the remaining two batch slots may be filled by a random selection of two additional utterances based on the probabilities of selection defined in the intent distribution 430. As depicted in FIG. 4B, two additional utterances corresponding to intents "1" and "5" are randomly selected to fill these remaining batch slots in the batch pool 224. In an alternative embodiment not depicted in FIG. 4B, each batch slot of the batch pool 224 may be filled solely according to the probabilities of selection defined in the intent distribution 430 without including at least one each corresponding intent in the batch pool 224.

5.0 Example Infrastructure Implementation

Figure 5:
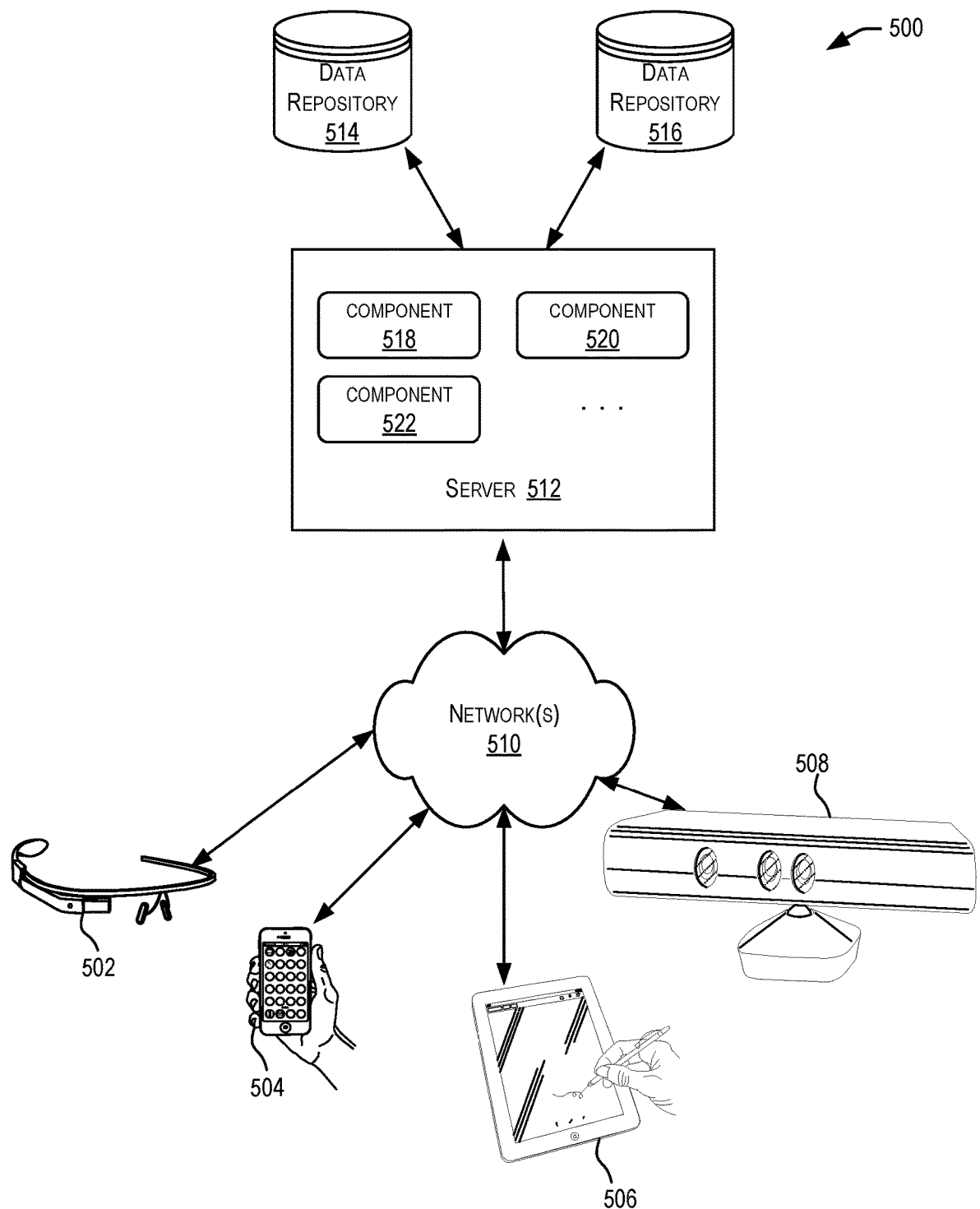
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable the processing described in this disclosure.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to interact with server 512 in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store data or information generated by the processing described herein and/or data or information used for the processing described herein. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
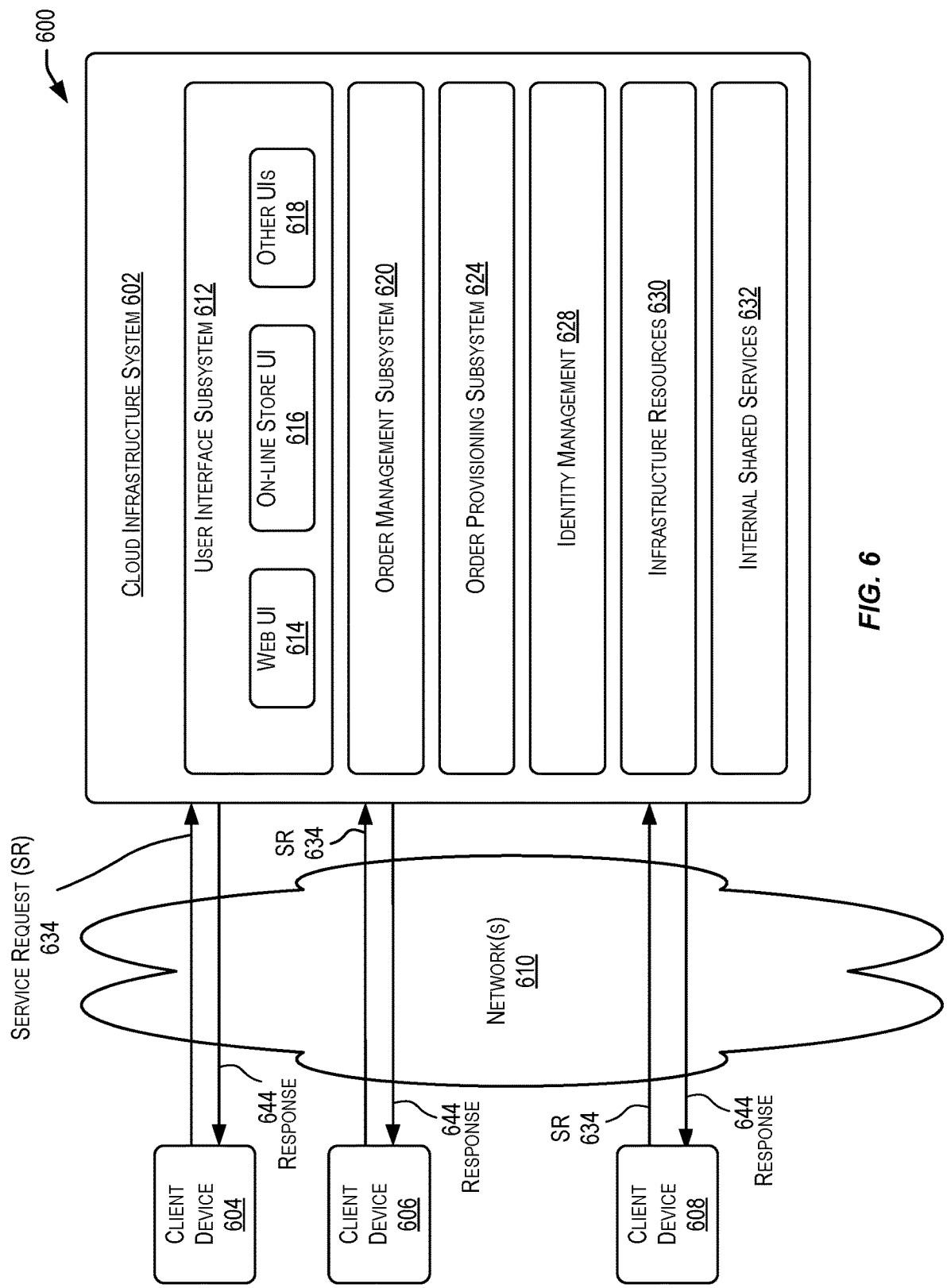
FIG. 6 is a simplified block diagram of a cloud-based system environment offering cloud services, in accordance with certain embodiments.

In certain embodiments, the functionalities described in this disclosure may be offered as services via a cloud environment. FIG. 6 is a simplified block diagram of a cloud-based system environment in which functionalities described herein may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, in certain embodiments, the chatbots-related functions described herein may be provided as cloud services that are subscribed to by a user/subscriber. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a chatbot-related service described in this disclosure.

In some embodiments, the processing performed by cloud infrastructure system 602 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
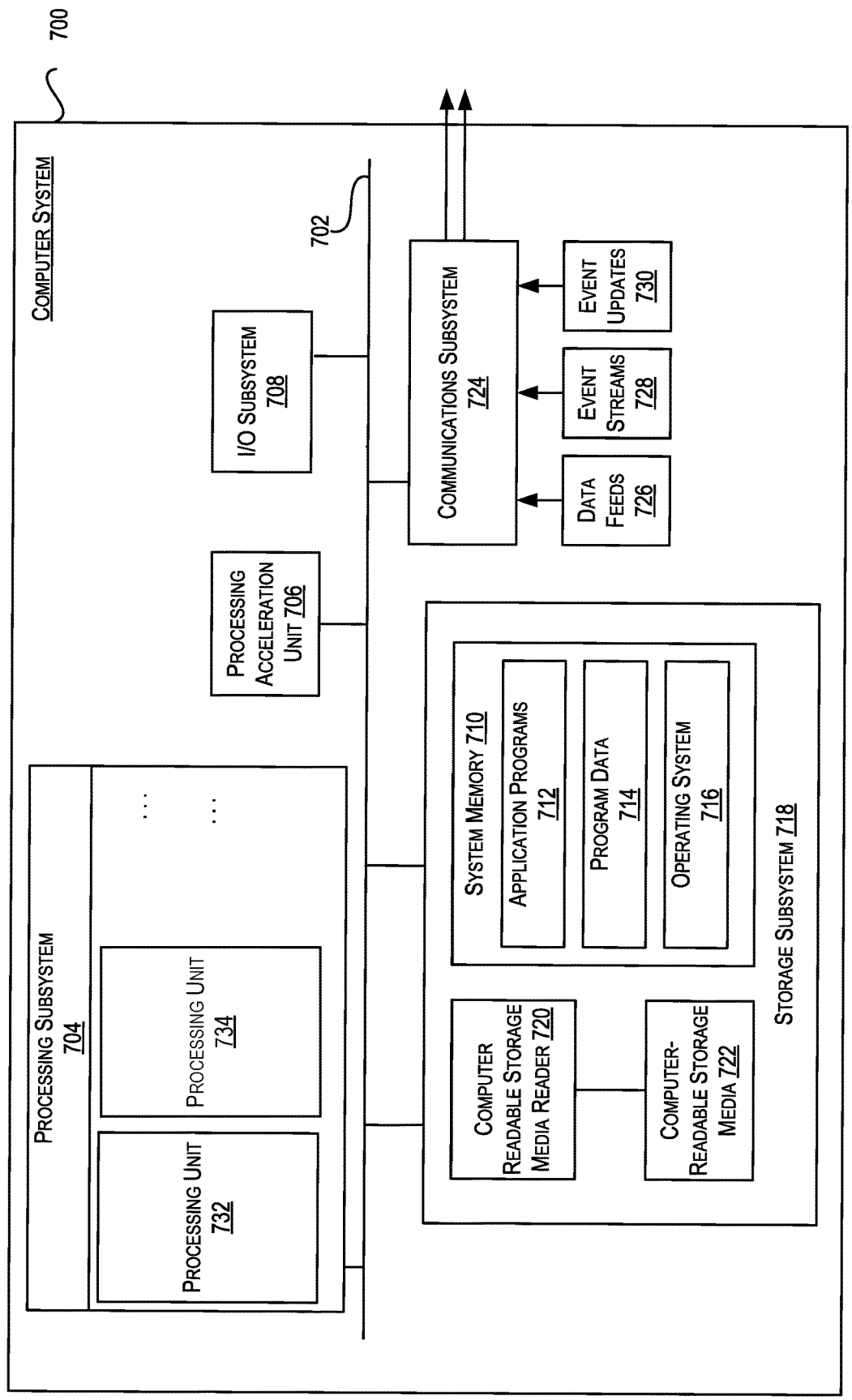
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the system and subsystems of a chatbot system, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722.

Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments. Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
storing, in a repository, a prediction model constructed as an intent classifier for one or more skills, the prediction model comprising a plurality of model parameters learned by a use of an objective function;
obtaining, by a processor, a plurality of utterances, wherein each utterance of the plurality of utterances corresponds to one of a plurality of intents, which are different from each other and are included in a set of intents, and wherein each intent of the plurality of intents corresponds to a skill of the one or more skills;
determining, by the processor, an intent distribution among the plurality of utterances as a plurality of intent proportions, each intent proportion of the plurality of intent proportions respectively corresponding to each intent, the determining comprising determining the plurality of intent proportions based on an overall number of intents in the set of intents and an individual number of each intent in the plurality of utterances;
generating, by the processor, a batch, the batch comprising a plurality of subsets of batch utterances selected from the plurality of utterances based on the plurality of intent proportions, wherein each subset of the plurality of subsets of batch utterances is selected for each intent and a number of utterances in the subset corresponds to the determined intent proportion for the intent;
accessing, by the processor, the prediction model stored in the repository;
training, by the processor, the prediction model on sets of training data from the batch, the training comprising:
iteratively inputting the sets of training data from the batch into the prediction model;
training the prediction model using the sets of training data by minimizing or maximizing the objective function, which measures a difference between predicted intents and ground truth intents, to cause the prediction model to learn relationships within the sets of training data that are used by the prediction model to generate the predicted intents, and
updating the plurality of model parameters; and
generating, by the processor, a trained prediction model comprising the plurality of model parameters associated with the learned relationships,
wherein the training the prediction model using the sets of training data from the batch causes the trained prediction model to exhibit a minimized bias toward any particular intent, and
wherein the trained prediction model is configured to, based on an utterance provided as an input, predict an intent for the one or more skills, and
wherein the predicting the intent causes the processor to launch an interactive application corresponding to a skill among the one or more skills.

2. The method of claim 1, further comprising generating a plurality of intent pools,
wherein each intent pool corresponds to a particular intent of the plurality of intents and comprises each utterance of the plurality of utterances that corresponds to the particular intent,
wherein each intent proportion of the plurality of intent proportions corresponds to a particular intent pool, and
wherein generating the batch further comprises selecting the number of utterances from the plurality of intent pools based on the plurality of intent proportions.

3. The method of claim 2, wherein each utterance selected from the plurality of intent pools is randomly selected from a corresponding intent pool.

4. The method of claim 1, further comprising:
determining a plurality of representative proportions, wherein each representative proportion of the plurality of representative proportions corresponds to a proportional representation of a particular intent across a number of corresponding utterances in the generated batch; and
determining whether each representative proportion of the plurality of representative proportions is within a threshold difference of a corresponding intent proportion of the plurality of intent proportions,
wherein causing training of the one or more skills by applying the batch to the one or more skills occurs in response to determining each representative proportion of the plurality of representative proportions is within a threshold difference of a corresponding intent proportion of the plurality of intent proportions.

5. The method of claim 1, wherein:
the intent distribution is a uniform distribution and each intent proportion is a uniform ratio calculated from the number of utterances in the batch and a number of intents in the plurality of intents; and
the method further comprises selecting each particular utterance of the number of utterances for inclusion in the batch based on a particular intent corresponding to the particular utterance and the uniform ratio.

6. The method of claim 1, wherein:
the intent distribution is a layered distribution and each intent proportion corresponds to a layered ratio of a plurality of layered ratios, each layered ratio calculated from a first ratio of the number of utterances in the batch and a number of skills in the one or more skills, and a number of intents corresponding to a particular skill; and
the method further comprises selecting each particular utterance of the number of utterances for inclusion in the batch based on a particular intent corresponding to the particular utterance, a particular skill corresponding to the particular intent, and a particular intent proportion corresponding to the particular intent.

7. The method of claim 1, wherein:
the intent distribution is a tailed distribution and each intent proportion corresponds to a tailed ratio of a plurality of tailed ratios,
each tailed ratio calculated from a first ratio of the number of utterances in the plurality of utterances and the number of utterances corresponding to a particular intent, and a number of utterances to be generated in the batch, and
the method further comprises:
determining one or more intents corresponding to an intent proportion below an intent threshold value;
selecting at least one utterance corresponding to each of the one or more intents corresponding to an intent proportion below the intent threshold value for inclusion in the batch; and
selecting each other particular utterance of the number of utterances for inclusion in the batch based on a particular intent corresponding to the particular utterance and a particular intent proportion corresponding to the particular intent.

8. The method of claim 1, wherein:
the intent distribution is a weighted distribution and each intent proportion is a weighted ratio, each weighted ratio calculated from a number of utterances in the plurality of utterances corresponding to a particular intent and a total number of utterances in the plurality of utterances, and multiplied by a particular weight value of a plurality of weight values; and
the method further comprises selecting each particular utterance for inclusion in the batch based on a particular intent corresponding to the particular utterance and a particular intent proportion corresponding to the particular intent.

9. The method of claim 8, wherein the plurality of weight values are based in part on a frequency distribution of the intents corresponding to the plurality of utterances.

10. The method of claim 8, wherein each weight value of the plurality of weight values is based in part on an average string length of all utterances of the plurality of utterances corresponding to a particular intent.

11. The method of claim 1, wherein:
each intent proportion is a batch ratio,
each batch ratio calculated from a number of utterances in the plurality of utterances corresponding to a particular intent and the number of utterances to be included in the batch, and
the method further comprises:
determining, that at least one intent proportion of the plurality of intent proportions does not meet or exceed a threshold value; and
in response to determining that at least one intent proportion of the plurality of intent proportions does not meet or exceed a threshold value, increasing the number of utterances to be included in the batch.

12. A system, comprising:
one or more data processors; and
a non-transitory computer-readable storage medium containing instructions which, when executed on the one or more data processors, cause the one or more data processors to perform operations including:
storing, in a repository of the system, a prediction model constructed as an intent classifier for one or more skills, the prediction model comprising a plurality of model parameters learned by a use of an objective function;
obtaining a plurality of utterances, wherein each utterance of the plurality of utterances corresponds to one of a plurality of intents, which are different from each other and are included in a set of intents, and wherein each intent of the plurality of intents corresponds to a skill of the one or more skills;
determining an intent distribution among the plurality of utterances as a plurality of intent proportions, each intent proportion of the plurality of intent proportions respectively corresponding to each intent, the determining comprising determining the plurality of intent proportions based on an overall number of intents in the set of intents and an individual number of each intent in the plurality of utterances;
generating a batch, the batch comprising a plurality of subsets of batch utterances selected from the plurality of utterances based on the plurality of intent proportions, wherein each subset of the plurality of subsets of batch utterances is selected for each intent and a number of utterances in the subset corresponds to the determined intent proportion for the intent;
accessing the prediction model stored in the repository;
training the prediction model on sets of training data from the batch, the training comprising:
iteratively inputting the sets of training data from the batch into the prediction model,
training the prediction model using the sets of training data by minimizing or maximizing the objective function, which measures a difference between predicted intents and ground truth intents, to cause the prediction model to learn relationships within the sets of training data that are used by the prediction model to generate the predicted intents, and
updating the plurality of model parameters; and
generating a trained prediction model comprising the plurality of model parameters associated with the learned relationships,
wherein the training the prediction model using the sets of training data from the batch causes the trained prediction model to exhibit a minimized bias toward any particular intent, and
wherein the trained prediction model is configured to, based on an utterance provided as an input, predict an intent for the one or more skills, and
wherein the predicting the intent causes the one or more data processors to launch an interactive application corresponding to a skill among the one or more skills.

13. The system of claim 12, wherein the operations further include:
generating a plurality of intent pools, wherein each intent pool corresponds to a particular intent of the plurality of intents and comprises each utterance of the plurality of utterances that corresponds to the particular intent, wherein each intent proportion of the plurality of intent proportions corresponds to a particular intent pool and generating the batch further comprises selecting the number of utterances from the plurality of intent pools based on the plurality of intent proportions.

14. The system of claim 13, wherein each utterance selected from the plurality of intent pools is randomly selected from a corresponding intent pool.

15. The system of claim 12, wherein the operations further include:
determining a plurality of representative proportions, wherein each representative proportion of the plurality of representative proportions corresponds to a proportional representation of a particular intent across a number of corresponding utterances in the generated batch; and
determining whether each representative proportion of the plurality of representative proportions is within a threshold difference of a corresponding intent proportion of the plurality of intent proportions,
wherein causing training of the one or more skills by applying the batch to the one or more skills occurs in response to determining each representative proportion of the plurality of representative proportions is within a threshold difference of a corresponding intent proportion of the plurality of intent proportions.

16. The system of claim 12, wherein:
each intent proportion is a batch ratio,
each batch ratio calculated from a number of utterances in the plurality of utterances corresponding to a particular intent and the number of utterances to be included in the batch, and
the operations further include:
determining, that at least one intent proportion of the plurality of intent proportions does not meet or exceed a threshold value; and in response to determining that at least one intent proportion of the plurality of intent proportions does not meet or exceed a threshold value, increasing the number of utterances to be included in the batch.

17. A non-transitory computer-readable storage medium storing a plurality of instructions executable by one or more processors, wherein the plurality of instructions, when executed by the one or more processors, cause the one or more processors to perform a method including:

storing, in a repository, a prediction model constructed as an intent classifier for one or more skills, the prediction model comprising a plurality of model parameters learned by a use of an objective function;

obtaining a plurality of utterances, wherein each utterance of the plurality of utterances corresponds to one of a plurality of intents, which are different from each other and are included in a set of intents, and wherein each intent of the plurality of intents corresponds to a skill of the one or more skills;

determining an intent distribution among the plurality of utterances as a plurality of intent proportions, each intent proportion of the plurality of intent proportions respectively corresponding to each intent, the determining comprising determining the plurality of intent proportions based on an overall number of intents in the set of intents and an individual number of each intent in the plurality of utterances;

generating a batch, the batch comprising a plurality of subsets of batch utterances selected from the plurality of utterances based on the plurality of intent proportions, wherein each subset of the plurality of subsets of batch utterances is selected for each intent and a number of utterances in the subset corresponds to the determined intent proportion for the intent;

accessing the prediction model stored in the repository;

training the prediction model on sets of training data from the batch, the training comprising:

iteratively inputting the sets of training data from the batch into the prediction model, training the prediction model using the sets of training data by minimizing or maximizing the objective function, which measures a difference between predicted intents and ground truth intents, to cause the prediction model to learn relationships within the sets of training data that are used by the prediction model to generate the predicted intents, and updating the plurality of model parameters; and generating a trained prediction model comprising the plurality of model parameters associated with the learned relationships, wherein the training the prediction model using the sets of training data from the batch causes the trained prediction model to exhibit a minimized bias toward any particular intent, and wherein the trained prediction model is configured to, based on an utterance provided as an input, predict an intent for the one or more skills, and wherein the predicting the intent causes the one or more processors to launch an interactive application corresponding to a skill among the one or more skills.

18. The non-transitory computer-readable storage medium of claim 17, wherein the method further includes generating a plurality of intent pools, wherein each intent pool corresponds to a particular intent of the plurality of intents and comprises each utterance of the plurality of utterances that corresponds to the particular intent, wherein each intent proportion of the plurality of intent proportions corresponds to a particular intent pool and generating the batch further comprises selecting the number of utterances from the plurality of intent pools based on the plurality of intent proportions.

19. The non-transitory computer-readable storage medium of claim 18, wherein each utterance selected from the plurality of intent pools is randomly selected from a corresponding intent pool.

20. The non-transitory computer-readable storage medium of claim 17, wherein the method further includes:

determining a plurality of representative proportions, wherein each representative proportion of the plurality of representative proportions corresponds to a proportional representation of a particular intent across a number of corresponding utterances in the generated batch; and determining whether each representative proportion of the plurality of representative proportions is within a threshold difference of a corresponding intent proportion of the plurality of intent proportions, wherein causing training of the one or more skills by applying the batch to the one or more skills occurs in response to determining each representative proportion of the plurality of representative proportions is within a threshold difference of a corresponding intent proportion of the plurality of intent proportions.

* * * * *

UNITED STATES PATENT AND TRADEMARK OFFICE
CERTIFICATE OF CORRECTION

PATENT NO. : 12,236,321 B2  
APPLICATION NO. : 17/217623  
DATED : February 25, 2025  
INVENTOR(S) : Duong et al.

Page 1 of 2

It is certified that error appears in the above-identified patent and that said Letters Patent is hereby corrected as shown below:

In the Specification

In Column 1, Lines 9-10, delete "119 (e)" and insert -- 119(e) --, therefor.

In Column 7, Line 47, delete "/child (or" and insert -- /child(or --, therefor.

In Column 20, Line 43, delete "[(0.2*0.4),0.2*0.3)," and insert -- [(0.2*0.4),(0.2*0.3), --, therefor.

In Column 24, Line 61, delete "infra-red" and insert -- infrared --, therefor.

In Column 31, Line 7, delete "Xbox" and insert -- Xbox® --, therefor.

In Column 32, Line 27, delete "Palm" and insert -- Palm® --, therefor.

In Column 32, Lines 57-58, delete "Reader 720 may receive and be configured to read data from a memory device such as a disk, a flash drive, etc." and insert the same on Column 32, Line 56, as a continuation of the same paragraph, therefor.

In Column 33, Lines 24-30, delete "EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface." and insert the same on Column 33, Line 23, as a continuation of the same paragraph, therefor.

In Column 34, Lines 8-24, delete "Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled Signed and Sealed this  
Third Day of June, 2025

Coke Morgan Stewart  
*Acting Director of the United States Patent and Trademark Office* in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly." and insert the same on Column 34, Line 9, as a new paragraph, therefor.

In the Claims

In Column 35, Line 37, in Claim 1, delete "model;" and insert -- model, --, therefor.